US006920984B2

(12) United States Patent
Agnew

(10) Patent No.: US 6,920,984 B2
(45) Date of Patent: Jul. 26, 2005

(54) RAINWATER TANK CLEANING SYSTEM

(76) Inventor: Warren Roy Agnew, 2 Young Street, R D 2, Warkworth (NZ)

(*) Notice: Subject to any disclaimer, the term of this patent is extended or adjusted under 35 U.S.C. 154(b) by 48 days.

(21) Appl. No.: 10/430,193

(22) Filed: May 7, 2003

(65) Prior Publication Data
US 2004/0108266 A1 Jun. 10, 2004

Related U.S. Application Data

(63) Continuation-in-part of application No. 10/310,832, filed on Dec. 6, 2002.

(51) Int. Cl.[7] .............................................. B01D 21/02
(52) U.S. Cl. ........................ 210/533; 210/536; 210/538
(58) Field of Search ............................. 210/525, 532.1, 210/533, 536, 538, 540, 803

(56) References Cited

U.S. PATENT DOCUMENTS

| 1,430,425 | A | * | 9/1922 | Widme | 210/533 |
|---|---|---|---|---|---|
| 2,179,246 | A | * | 11/1939 | Applebaum | 210/533 |
| 3,224,593 | A | * | 12/1965 | Ross | 210/519 |
| 3,951,816 | A | * | 4/1976 | Bascope et al. | 210/525 |
| 4,406,789 | A | * | 9/1983 | Brignon | 210/532.1 |
| 5,435,924 | A | * | 7/1995 | Albertson | 210/803 |
| 5,552,050 | A | * | 9/1996 | Valentin | 210/525 |
| 6,371,308 | B1 | * | 4/2002 | Zhou | 210/532.1 |

OTHER PUBLICATIONS

Copy of the Examination Report dated Apr. 24, 2002 from New Zealand Intellectual Property Office.

* cited by examiner

Primary Examiner—Christopher Upton
(74) Attorney, Agent, or Firm—Young & Thompson

(57) ABSTRACT

A rainwater cleaning system for a water tank comprises a pipe element having a closed end located on the floor of the tank. The pipe element also has an open end connectable to an outflow pipe from the tank. Located near the closed end of the pipe element is at least one hole. The cross sectional area of the hole preferably at least equals the cross sectional area of the pipe outflow.

11 Claims, 5 Drawing Sheets

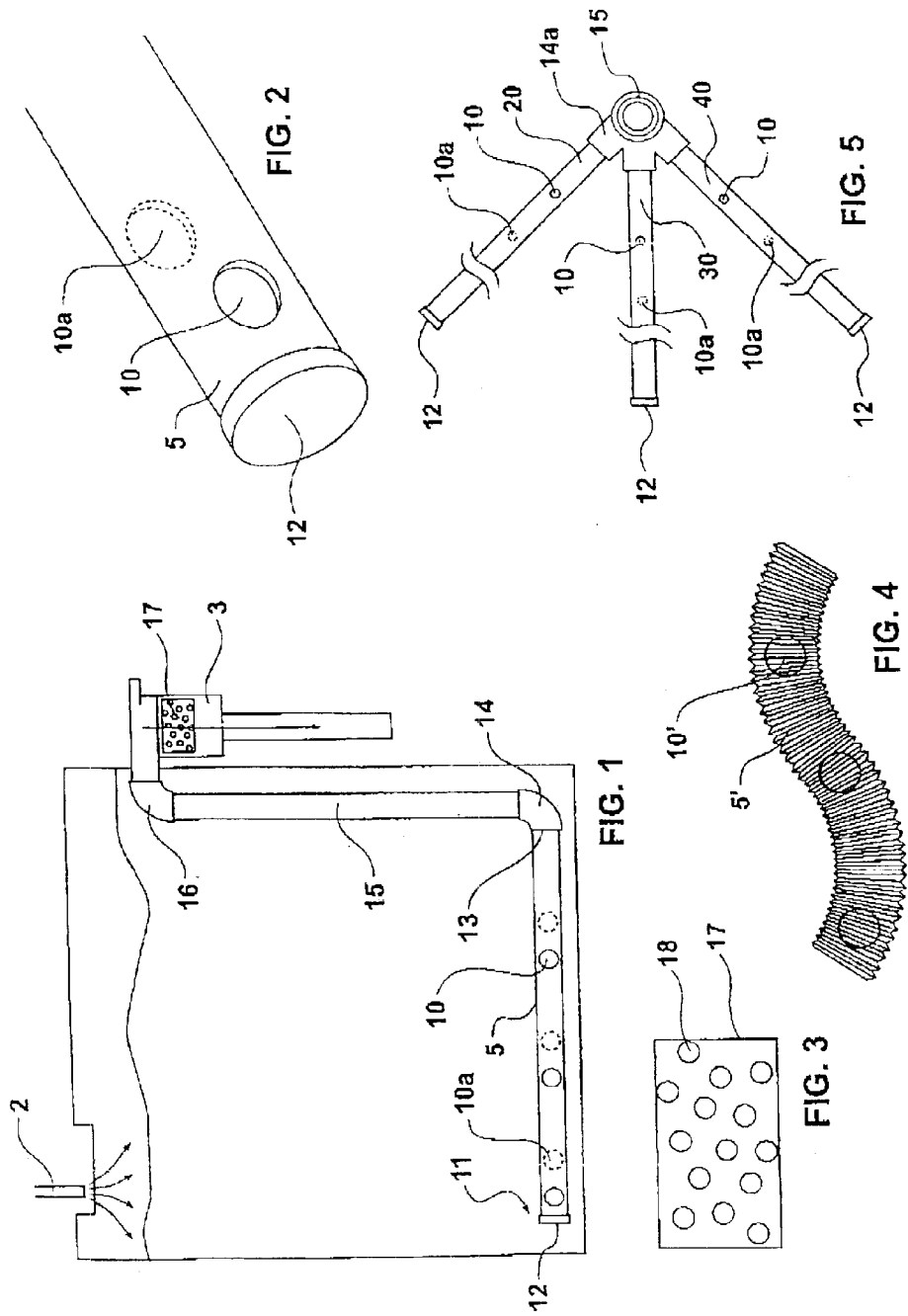

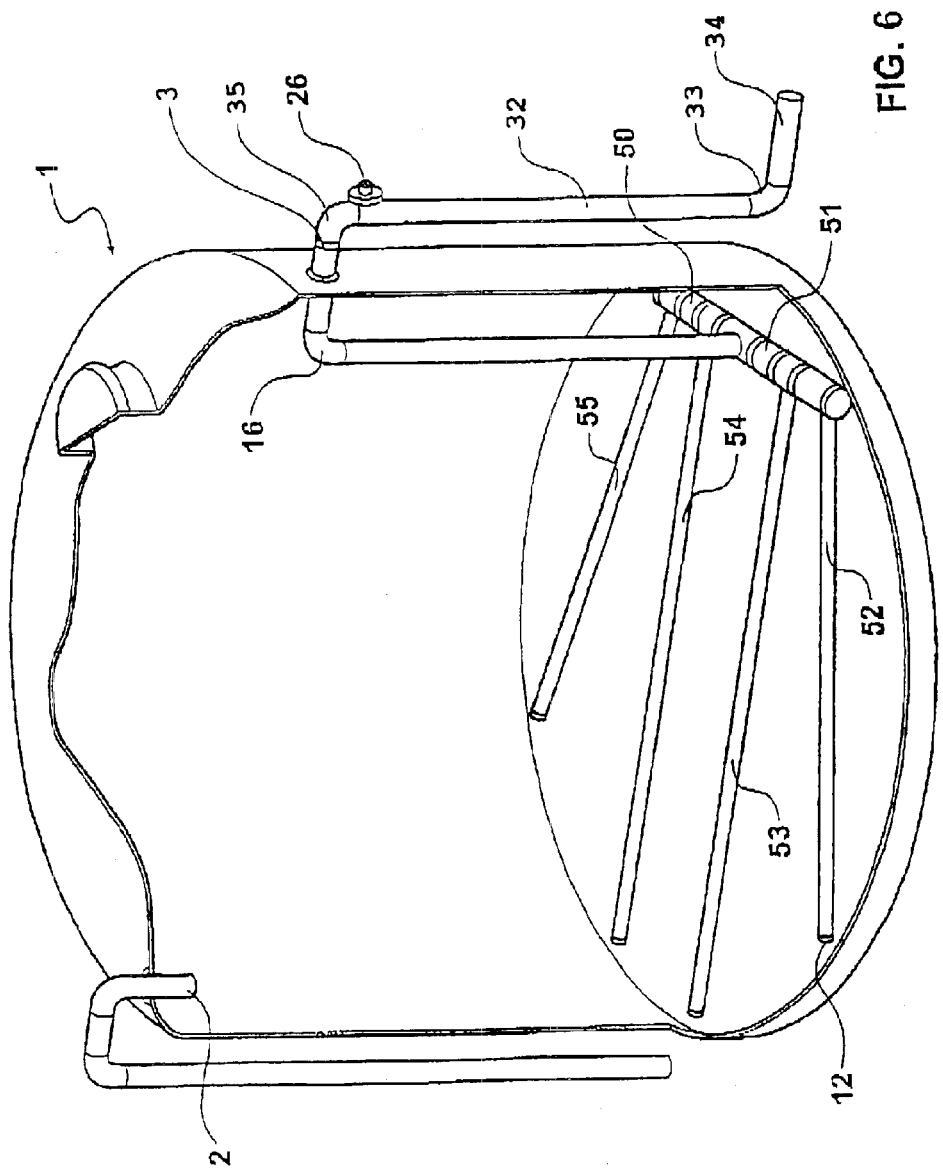

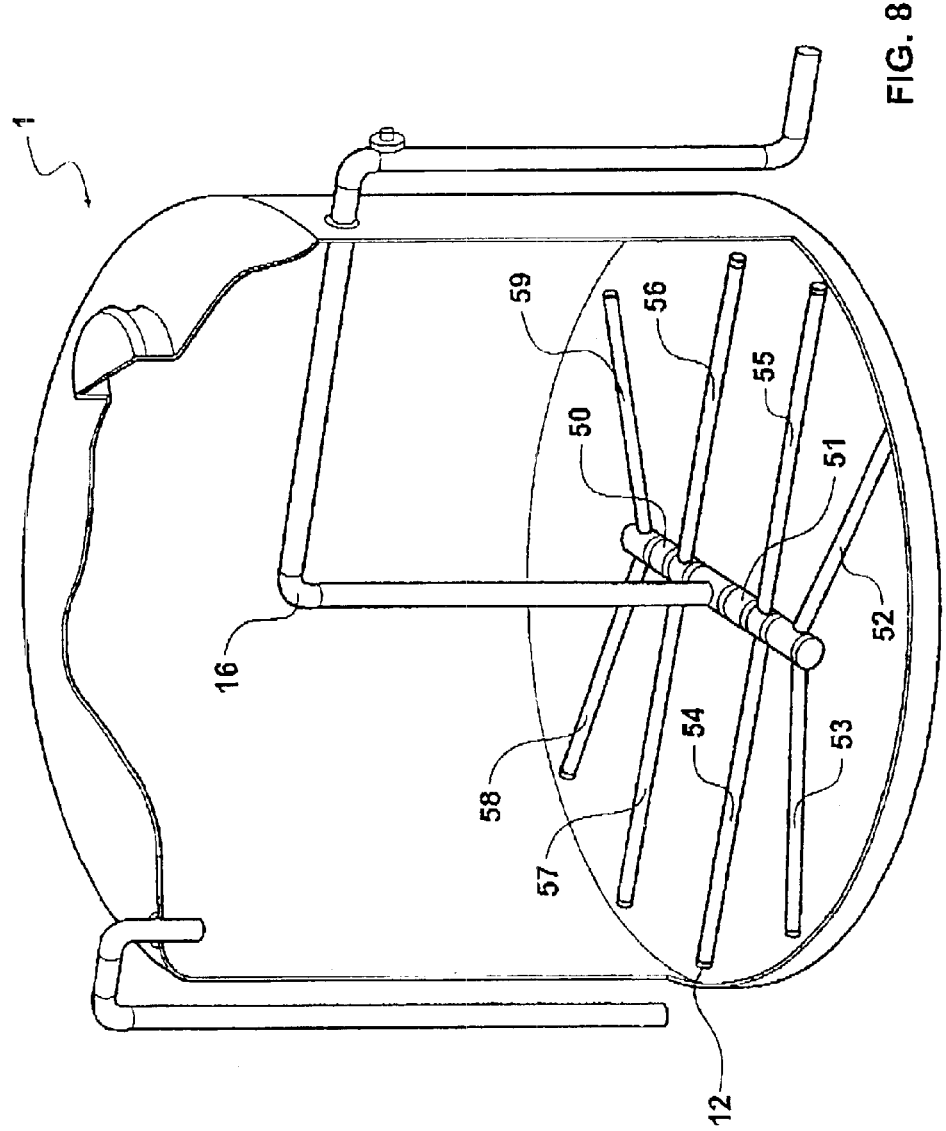

RAINWATER TANK CLEANING SYSTEM

BACKGROUND OF THE INVENTION

In many households dependent on the collection of rainwater as a source of drinking water, the collection area is normally the house roof and the rainwater is stored in a tank that can be constructed of iron, polyethylene, or concrete and which is located on a level below and in close proximity to the house roof so that the water flows by gravity down the spouting and to the storage tank.

Wind blown seeds, leaves, sticks, pollen, sand, road dust, bird droppings and dead insects etc can accumulate on the roof.

A problem associated with rainwater stored in a tank is a build-up of sediment and plant material, which has been carried off the roof along the spouting by the rainwater, and into the storage tank. As a result of the decaying plant material, nutrients are released into the surrounding water. It is these nutrients that support colonies of bacteria and protozoa.

The sediment decaying, places an oxygen demand on the tank water. The process of decay can significantly lower the available oxygen in the water.

There are devices to minimise the plant material which is carried off the roof. Devices such as screens that fit into the gutters to prevent the accumulation of leaves and filters or leaf diverters on the spouting outlet and/or the entrance to the tank, also minimise the deposit of leaves in the tank. These devices do not however prevent smaller particles such as seeds, pollen, road dust, sand and broken parts of leaves and sticks etc from accumulating in the rainwater tank.

It is known to vacuum out tanks to remove the build up of sediment, in the same manner that swimming pools can be vacuumed out. The equipment to do so is expensive and it is normal for a householder to engage an independent contractor to occasionally clean out the tank.

The cost of cleaning out a rainwater tank can be several hundred dollars.

As storage tanks are located below the roof, it is necessary to use a pump to either pump the water to a header tank to thus provide pressure to the household water system, or to use the pump itself to provide pressure to the household water system.

The pumps, draw in and break down, the water sodden plant material to minute but still visible particles that contaminate the household water supply.

Sometimes these particles can be clearly seen when a glass of water is poured and are more obvious when water is run into a bath.

In addition the impurities flow into the hot water cylinder where they cause a build up of material within the cylinder itself.

The inventor has come up with a novel and inexpensive system for removing the build up of sediment from rainwater tanks.

OBJECT OF THE INVENTION

It is the object of the present invention to provide an improved rainwater cleaning system which will obviate or minimise the known problems in a simple yet effective manner or which will at least provide the public with a useful choice.

STATEMENT OF INVENTION

A first aspect of the invention provides for a rainwater cleaning system comprising a pipe means having a closed end located on the floor of a tank and having an open end connectable to an outflow from the tank; located near the closed end of the pipe means is at least one hole, the surface area of the hole preferably at least equals the cross sectional area of the pipe outflow.

Preferably the pipe means has a number of holes, the combined cross sectional area of the holes preferably equals the cross sectional area of the pipe overflow.

Preferably the pipe means has a plurality of holes, the combined cross sectional area of the holes is preferably greater than the cross sectional area of the pipe overflow.

Preferably the combined surface area of the hole or holes equals the cross sectional area of the pipe outflow.

Preferably the combined surface area of the hole or holes is greater than the cross sectional area of the pipe outflow.

Preferably the outflow pipe has at least one anti-siphon means therein.

Preferably the anti-siphon means is a valve.

Preferably the outflow pipe has at least one air hole which permits the ingress of air and prevents the siphoning of water from the rainwater tank.

Preferably the pipe means comprises a single pipe located on the floor of the tank.

Preferably the pipe means comprises a number of pipes located on the floor of the tank.

A second aspect of the invention provides for a kit for use as a rainwater cleaning system comprising at least:
 a) a pre-drilled pipe or pipes for the base of the tank,
 b) an end cap or caps for the pre-drilled pipe or pipes,
 c) a pipe to rise up the inside of the tank,
 d) two right-angled bends,
 e) PVC solvent glue, In another aspect the rainwater cleaning system (TANK-VAC™) comprises a pipe means having a closed end located on the floor of the tank and having an open end connectable to an outflow from the tank; located near the closed end of the pipe is at least one hole, preferably a number of holes; the combined surface area of the hole or holes preferably greater than the cross sectional area of the pipe outflow; the outflow pipe preferably has at least one air hole on its upper surface which permits the ingress of air and prevents the siphoning of water from the rainwater tank.

BRIEF DESCRIPTION OF THE DRAWINGS

The invention will now be further described by way of example only with reference to a preferred embodiment and to the attached drawings in which:

FIG. 1 is a section view of a preferred embodiment of the present invention.

FIG. 2 is an exploded view of the pipe as shown in FIG. 1.

FIG. 3 is an exploded view of the overflow pipe shown in FIG. 1.

FIG. 4 shows a flexible pipe as a second embodiment of the present invention.

FIG. 5 shows a pipe means having multiple pipes as a third embodiment of the present invention.

FIGS. 6–8 are exploded perspective views of alternative outflow structures.

DETAILED DESCRIPTION OF THE DRAWINGS

Figure 7:
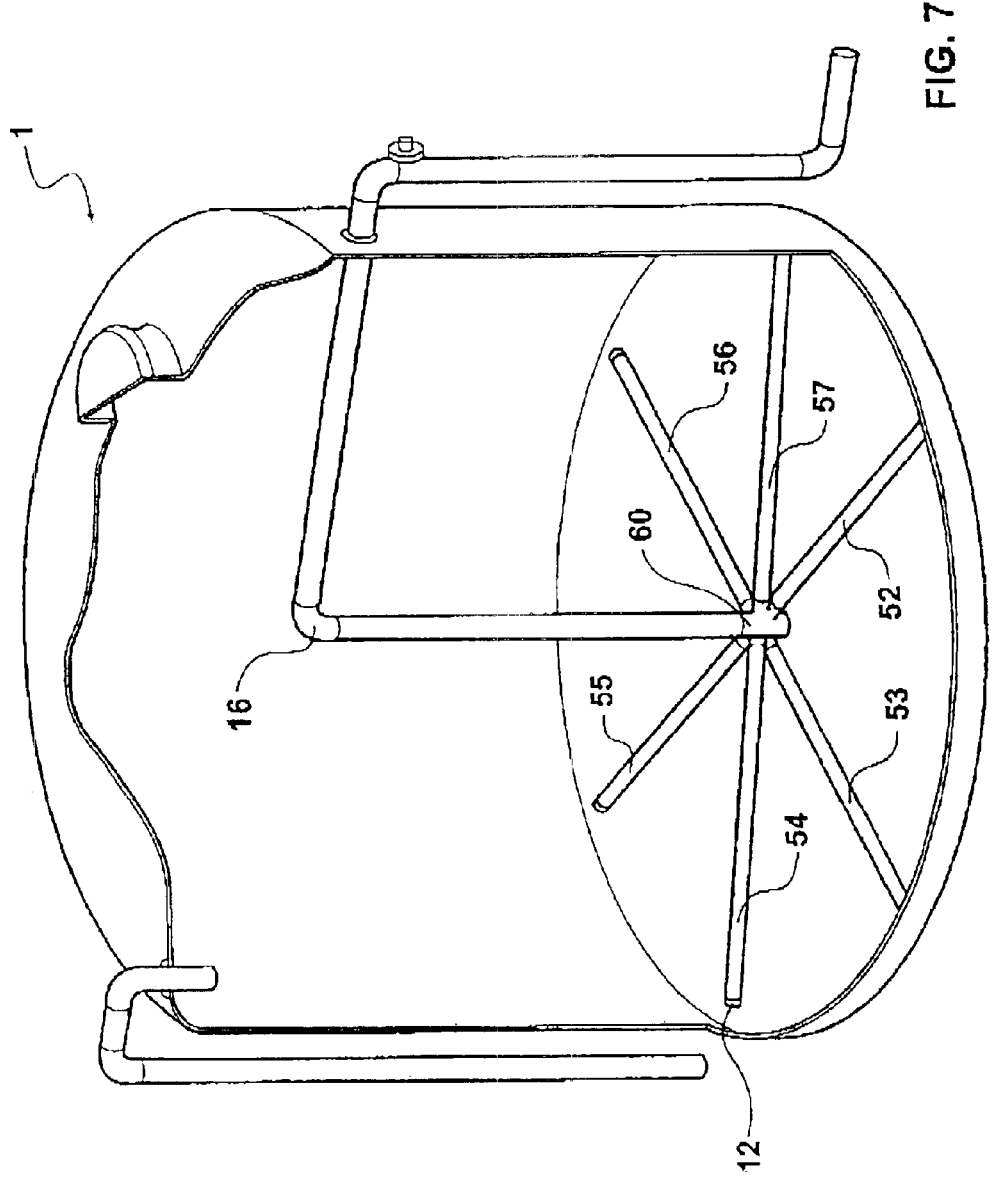

Shown in FIG. 1 is the TANK-VAC™ siphonic system installed in a plastic rainwater tank 1 having an inlet 2 and a pipe means including an outlet 3. A rainwater pipe from the roof discharges water into the inlet 2. When the water from the inlet 2 enters the tank the water level is raised above outlet 3 causing the tank to overflow.

The pipe means also includes at least one polyethylene pipe 5 having six identically sized holes 10 and 10A cut in the sides of the pipe 5. The free end 11 of the pipe 5 is sealed usually with a cap 12. The other end 13 is attached to an elbow 14 which is itself attached to a second pipe 15. The pipe 15 is connected to a second elbow means 16 which is itself connected to the outlet pipe 3.

In FIG. 3 is shown an exploded view of the small holes 18 formed in outlet pipe 3 at 17, to prevent a siphoning effect from the invention. As shown in FIG. 1 the small holes 18 or inlet valve 26, to allow air inside, are positioned in the outflow pipe at a suitable position below the top such that the head is not reduced too much but lower enough from the top to interrupt the normal gravitational discharge flow, so that the tank is not completely emptied. Other positions on the outflow are also possible. These holes 18 can be very small or any suitable dimensions and configuration but can be covered if necessary by a mesh 17 which protects them from insects or any pests from entering the system. Further, mesh can also be added to the pipes where necessary to restrict access by unwanted pests. The discharge cross sectional area of the outlet or outflow pipe 3 can be the same or greater as the total cross sectional area of the holes 10 and 10A cut into the pipe 5.

WORKING EXAMPLE 1

A 150 litre tank was used for trials. A 40 mm diameter PVC water pipe had one end sealed and six holes drilled into it. This pipe was placed on the base of the plastic water tank. The surface area of the six holes equalled the surface area of the discharge outlet for maximum outflow. Various types of sediment were placed in the tank and the tank was caused to overflow. When the tank overflowed the sediment was drawn into the six holes in the pipe and exited from the tank via the outlet. The amount of sediment exiting the tank could be clearly measured from observing changes in the colour of the water exiting the tank. Regardless of whether leaves, dirt or sand particles were used as sediment, the result was an almost instant removal of the sediment whenever the tank overflowed.

WORKING EXAMPLE 2

In a similar manner to Example 1 the invention was trialed on a 4,000 gallon rainwater tank. The only difference was that an 80 mm PVC water pipe was used rather than the 40 mm PVC pipe. Again six holes were drilled in the pipe and sediment was added to the tank. When the tank was caused to overflow, the sediment was drawn out of the tank through the holes in the pipe.

When water flows from the house roof and enters the inlet 2 of the tank; rather than flowing directly through the outflow 3, the TANK-VAC™ system causes the water at the base of the tank to enter the holes 10 and 10a located in the pipes at the base of the tank 1. The water entering the holes 10 and 10a in the pipe 5 draws in the sediment, plant material, dirt and other particulate solids on the base of the storage tank and by siphon action washes them out through the overflow 3. In this way the fresh water entering the tank is not immediately removed by the overflow and the tank is automatically cleaned.

The TANK-VAC™ overflow system provides for cleaning of the rainwater tank whenever the water storage system begins to overflow.

As seen in FIG. 2 the section of pipe means 5 that lies on the base of the tank has a number of holes 10 and 10a drilled into the side of the pipe. The size of the holes and the number of holes 10 and 10a can be varied to take account of particular contaminant problems. The holes can be sited anywhere on the pipe. Preferably they are better sited on the lower portion facing the floor of the tank to minimise being blocked.

If large leaves have been drawn into the water storage system then the holes in the flexible pipe can be made of sufficient diameter to allow the leaves to be drawn into the pipe and discharged from the overflow.

Whilst the cleaning action will work regardless of the size and number of holes in the pipe it is preferably that the total surface area of the holes drilled into the TANK-VAC™ pipe at least equals the cross sectional area of the water tank pipe overflow. More preferably, the total cross sectional area of the holes is greater than the cross sectional surface area of the water tank overflow. The suction is maintained through the siphon system. This invention allows the older less oxygenated water in the tank to be expelled whenever fresh water enters the tank.

Figure 11:
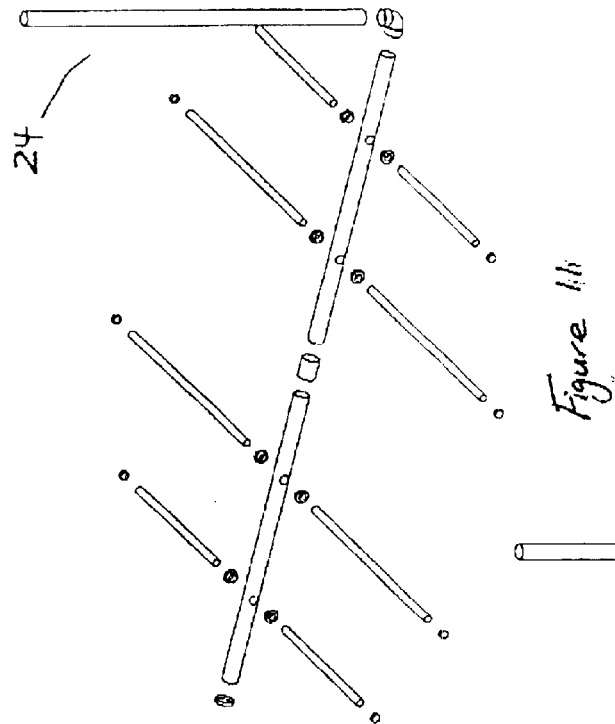
FIG. 11 is an exploded view of the layout of FIG. 9.
Figure 9:
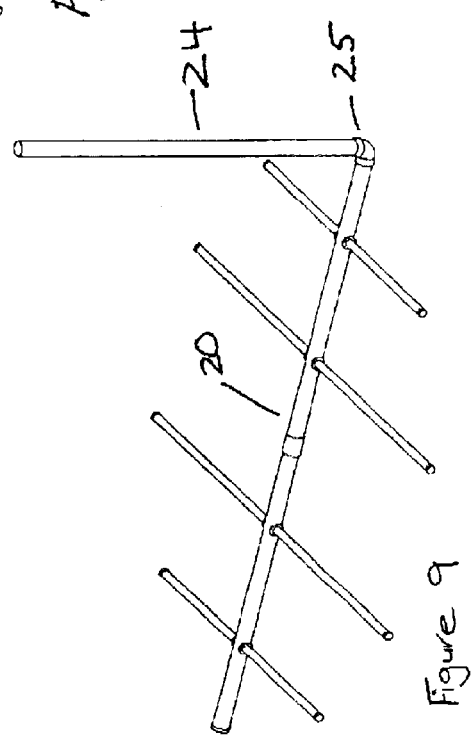
FIG. 9 is a perspective top view of another alternative outflow layout.
Figure 10:
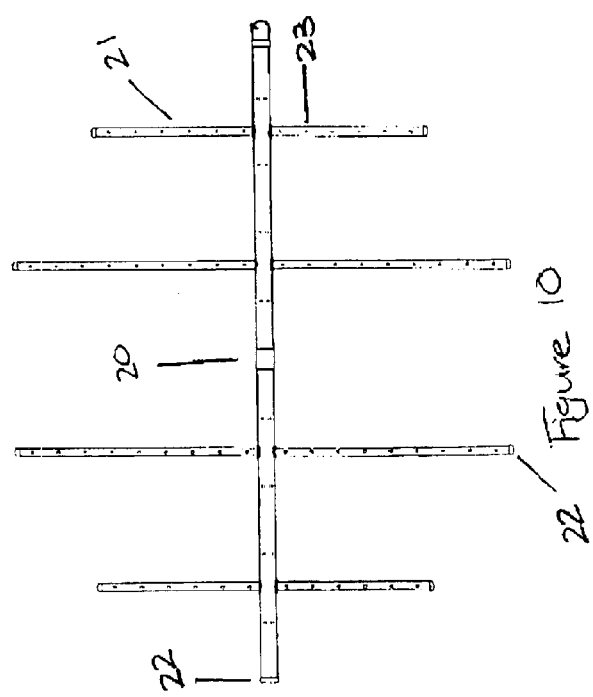
FIG. 10 is an underneath view of the layout of FIG. 9.

For ease of use, a standard pipe (e.g. 80 mm diameter) which is readily available can be used as the pipe diameter in the pipe means. The 80 mm diameter pipe can be selected whereby 10 mm diameter holes can be placed at regular spacing of say 270 mm. As shown in FIGS. 9–11 there is one preferred layout of pipes whereby there is a central pipe 20 having branch pipes 21 extending therefrom. Each branch pipe has an end cap 22. Pipes 20 and 21 have holes 23. In terms of flow from the central pipe 20 and branch pipes are substantially horizontal and a vertical pipe 24 leads from central pipe 20 and onwards to the outflow pipe. Joining members such as elbows 25 join the vertical pipes with horizontal pipes. The joining members can be any desired angle to enable fluidly joined pipes. The make up of the layout of the pipes can be selected to enable assembly through a standard manhole at the top of the tank. All the pipes have the holes 23 located or placed on either side of the centre line of the pipe when placed in the tank bottom or in a horizontal orientation. The holes 23 can point downwards as shown the underneath view of FIG. 10. FIG. 11 shows the pipe assembly of FIG. 9 in an unassembled position. Various combinations and variations of the hole shape and layout is envisaged.

To prevent excess water siphoning from the storage tank the tank-vac system is controlled by forming of at least one air hole in the top of the overflow pipe and on the outside of the tank.

It is envisaged that the invention would be sold as a kit with instructions. The kit comprising the following:

A pre-drilled pipe for the base of the tank;

An end cap for the pre-drilled pipe;

A pipe to rise up the inside of the tank;

Two right-angled bends;

PVC solvent glue;

A square of fine mesh—this is optional.

In tanks which are not readily accessible, it may be necessary to make a new overflow outlet or to position the pipe within the tank by means of mechanical tongs.

Whilst the invention has been described with particular reference to a rigid pipe, it is quite clear that the invention will also work with flexible piping as shown in FIG. 4, which will allow for movement of the pipe around the base of the tank.

In place of a single pipe, multiple pipes 20, 30 and 40 can be used as shown in FIG. 5. Many different pipe configurations for the pipe means are envisaged. For example a single pipe 5 leading to at least one vertical pipe section 15 or pipe 5 can be a series of pipes fanning out from a single pipe or a circular shape or there can be pipe the length of the diameter of the tank with at least one pipe radiating or at right angles thereto. It is necessary to cover the tank bottom so that substantially all contaminants can be removed. This will depend on what level is required. If the diameter length of pipe is used, this can be easier to install and insert into the tank as it is less likely to bend when lowering to the tank bottom. With different pipe configurations, different positions for the inlet and outlet pipes are also possible.

In FIGS. 6–8 there are further embodiments of the invention wherein the outflow pipe-work inside the tank or outside of the tank, can be in another form or configuration. The outlet 3 can have a vertical portion 32 joined by another elbow 33 to a horizontal portion 34. Another elbow 35 can be used to join to the outlet 3. This structure can be used to increase fluid flow through the pipe means which can serve to create surges to loosen and remove any block from leaves etc. The outlet can include an anti-siphon means 26 located such that any possible siphoning cannot occur. The anti-siphon means can be at least one correctly positioned aperture or a valve. This outlet structure can be combined with the outlet structure of FIG. 1. The anti-siphon member for example can be a valve member such as a HUNTER™ valve or at least one aperture.

FIGS. 6, 7 and 8 show examples of various pipe configurations. Also integral pipe lengths and various joining methods are also possible. If the tank is a different shape (e.g. square, rectangular etc) then other pipe configurations are also envisaged. In FIG. 6 there is a feeder portion 50 and 51 with pipes 52–55 being connected thereto. FIG. 7 shows a radial pipe configuration having a central node connector 60 with several spokes or pipes 52–57 while the example in FIG. 8 shows a diameter branch type length 50 and 51 with branches 52–59. Many variations are possible.

Throughout the description of this specification the word "comprise" and variations of that word, such as "comprising", are not intended to exclude other additives, components, integers or steps.

To those skilled in the art to which the invention relates, many changes in construction and widely differing embodiments and applications of the invention will suggest themselves without departing from the scope of the invention as defined in the appended claims. The disclosures and the description herein are purely illustrative and are not intended to be in any sense limiting.

What I claim is:

1. A rainwater cleaning system comprising:
    a pipe means having a closed end located on the floor of a tank and having an open end connected to an outflow from the tank;
    located near the closed end of the pipe means is at least one hole, the surface area of the hole at least equals the surface area of the outflow, and
    wherein the outflow includes an upwardly extending pipe portion fluidly connected to a further pipe portion extending through a side wall of the tank, and wherein the further pipe portion is fluidly connected to a downwardly extending pipe portion.

2. A rainwater cleaning system as claimed in claim 1, wherein the pipe means has a number of holes, the combined surface area of the holes equals the surface area of the outflow.

3. A rainwater cleaning system as claimed in claim 1, wherein the pipe means has a number of holes, the combined surface area of the holes is greater than the surface area of the outflow.

4. A rainwater cleaning system as claimed in claim 1, wherein the downwardly extending pipe portion has at least one anti-siphon means therein.

5. A rainwater cleaning system as claimed in claim 4 wherein the anti-siphon means is a valve.

6. A rainwater cleaning system as claimed in claim 4, wherein the downwardly extending pipe portion has at least one air hole which permits the ingress of air and prevents the siphoning of water from the rainwater tank.

7. A rainwater cleaning system as claimed in claim 1 wherein the pipe means comprises a single pipe located on the floor of the tank.

8. A rainwater cleaning system as claimed in claim 1 wherein the pipe means comprises a number of pipes located on the floor of the tank.

9. A rainwater cleaning system as claimed in claim 1, wherein the wall through which the further pipe portion extends is generally perpendicular to the floor and wherein said further pipe portions extends through said wall near a top thereof.

10. A rainwater cleaning system, comprising:
    a rainwater collection tank having a floor and a wall generally perpendicular to said floor;
    an inlet for receiving collected rainwater at an upper part of said tank;
    a debris removing outlet through an upper part of said wall;
    a first pipe inside said tank and extending across said floor directly on said floor, said first pipe having one end that is closed and an opposite end that is connected to said outlet by a riser that is inside said tank, said first pipe having plural debris-collecting holes spaced along a length thereof where said first pipe is directly on said floor, a combined cross sectional area of said plural holes being at least as great as a cross sectional area of said outlet;
    a downwardly extending pipe portion external to said tank and connected to said outlet, wherein said first pipe, said riser and said downwardly extending pipe portion are in fluid communication so that water and debris entering said plural holes exits from said downwardly extending pipe portion; and
    an anti-siphon device in said downwardly extending pipe portion, said anti-siphon device having at least one opening at a height above said floor that prevents emptying the tank.

11. The system of claim 10, wherein said first pipe comprises plural pipe parts that are arrayed across said floor and in fluid communication with said riser, each of said pipe parts having plural ones of said holes therein.

\* \* \* \* \*